| United States Patent [19] | [11] | 4,304,891 |
|---|---|---|
| Sato et al. | [45] | Dec. 8, 1981 |

[54] PROCESS FOR PRODUCING α-OLEFIN POLYMERS

[75] Inventors: Akihiro Sato, Chiba; Masami Tachibana, Ichiharashi; Kazutsune Kikuta, Ichiharashi; Yoshiharu Higuchi, Ichiharashi, all of Japan

[73] Assignee: Chisso Corporation, Osaka, Japan

[21] Appl. No.: 144,555

[22] Filed: Apr. 28, 1980

[30] Foreign Application Priority Data

Mar. 22, 1980 [JP] Japan ................................. 55-36343

[51] Int. Cl.$^3$ .......................... C08F 4/02; C08F 10/00
[52] U.S. Cl. .................................. 526/97; 252/429 B;
525/247; 526/114; 526/115; 526/116; 526/119;
526/121; 526/122; 526/124; 526/125; 526/348;
526/348.6; 526/351; 526/901; 526/902;
526/904
[58] Field of Search ............... 526/124, 125, 114, 115,
526/116, 121, 122; 525/247, 97, 119

[56] References Cited

U.S. PATENT DOCUMENTS

| 4,158,088 | 6/1979 | Iwao et al. | ......................... 526/142 |
| 4,187,385 | 2/1980 | Iwao et al. | ......................... 526/125 |

FOREIGN PATENT DOCUMENTS

| 2739608 | 3/1978 | Fed. Rep. of Germany | ...... 526/904 |
| 2918089 | 2/1980 | Fed. Rep. of Germany | ...... 526/124 |
| 2920799 | 3/1980 | Fed. Rep. of Germany | ...... 526/124 |
| 1001820 | 8/1965 | United Kingdom | ................ 526/139 |
| 1299863 | 12/1972 | United Kingdom . | |

*Primary Examiner*—Edward J. Smith
*Attorney, Agent, or Firm*—Fred Philpitt

[57] ABSTRACT

A process for producing α-olefins is provided which comprises:

milling (A) a trivalent metal halide together with (B) a divalent metal compound, in a specified ratio of (A) to (B), and reacting them to obtain a solid product (I);

reacting with this product (I), (C) an electron donor and (D) an electron acceptor, (C) and (D) being respectively reacted once or more up to ten times, and TiCl$_4$ being employed as the electron acceptor at least once, to obtain a solid product (II);

combining with this product (II), (E) a trialkylaluminum and (G) a reaction product of an electron donor with an electron acceptor, and in this combination, subjecting a part or the whole of the catalyst components (product (II), (E) and (G)) to polymerization treatment by reacting (F) an α-olefin at least in the presence of the product (II) and trialkylaluminum, to obtain a preliminarily activated catalyst; and polymerizing an α-olefin in the presence of this catalyst.

The above catalyst is suitable particularly for gas phase polymerization or suspension or bulk polymerization followed by gas phase polymerization, and affords a highly crystalline α-olefin polymer having a good particle form, with a high yield.

15 Claims, No Drawings

PROCESS FOR PRODUCING α-OLEFIN POLYMERS

BACKGROUND OF THE INVENTION

1. Field of the Invention

This invention relates to production of α-olefin polymers, and more particularly it relates to a process for producing highly crystalline α-olefin polymers having a good particle form, with a high yield, by the use of a preliminarily activated catalyst which is suitable for polymerization of α-olefins, particularly gas phase polymerization, and further, as a modification of gas phase polymerization, a combination of slurry or bulk polymerization with gas phase polymerization.

2. Description of the Prior Art

The inventors of the present application have developed processes for polymerizing ethylene or α-olefins containing ethylene, by the use of catalysts comprising a combination of an organoaluminum, etc. with a solid product (which will be hereinafter referred to as solid catalyst component) obtained by having a transition metal compound supported on a solid product (I) obtained by reacting a trivalent metal halide with a divalent metal compound, in the following various reaction manners.

For examples, the following processes have been proposed:

(1) a process wherein a transition metal compound is reacted with the above-mentioned solid product (I) in the presence of an aromatic compound (Japanese patent publication Nos. 13,609/1972, 16,782/1974, etc.);

(2) a process wherein the above-mentioned solid product (I) is reacted with a polysiloxane or an electron donor, and thereafter with a transition metal compound (Japanese patent publication No. 13,827/1977, Japanese patent application laid-open No. 61,283/1979);

(3) a process wherein a polysiloxane or an electron donor and a transition metal compound are added at the same time or a complex of them is added to the above-mentioned solid product (I), to effect reaction (Japanese patent application laid-open Nos. 116,078/1979, 113,687/1979, 124091/1979, etc.);

(4) a process wherein either one or both of at least one kind of electron donors and at least one kind of electron acceptors are reacted with the above-mentioned solid product (I), in a plurality of divided portions (Japanese patent application No. 101,960/1978);

(5) a process wherein at least one kind of electron donors and at least one kind of electron acceptors are reacted with the above-mentioned solid product (I), and at that time, $TiCl_4$ is employed as the electron acceptor at least once, and further the resulting solid catalyst component, an organoaluminum compound and an electron donor are combined together (Japanese patent application No. 106,797/19778);

(6) a process wherein at least one kind of electron donors and at least one kind of electron acceptors are reacted with the above-mentioned solid product (I), and at that time, $TiCl_4$ is employed as the electron acceptor at least once, and then a combination of the resulting solid catalyst component with an organoaluminum compound, an α-olefin and an electron donor is subjected to a polymerization treatment to prepare a preliminarily activated catalyst for α-olefin polymerization (Japanese patent application No. 148,728/1979); and (7) a process wherein various additives such as titanium alkoxides, silicone oils, polyethylene glycol dialkyl ethers, other electron donors, etc. are added at the time of polymerization (Japanese patent publication Nos. 13,609/1972, 13,772/1972). The inventions of these processes (1) to (7) will be hereinafter referred to as prior inventions.

In case where these prior inventions are applied to slurry polymerization or bulk polymerization, various advantages are brought about such that polymer yield per unit weight of catalyst component is very high; crystallinity of polymers of α-olefins such as propylene is high; particle form of polymers is good; particularly in the case of the inventions of the processes (5) to (7), it is possible to control the molecular weight distribution into a narrower range; etc.

However, in case where the prior inventions are applied to gas phase polymerization, various disadvantages occur such that the resulting polymer contains a large amount of amorphous polymer, and unless this amorphous polymer is removed, the polymer is soft and unsuitable for application fields where high rigidity is required; when a film is made from the polymer, its surface is sticky; since the monomer in the polymerization vessel is present in the gas phase, the monomer concentration is relatively low as compared with the case of slurry polymerization or bulk polymerization, and hence the reaction rate is so low that the polymer yield per unit weight of catalyst is insufficient; and unless catalyst residue is removed from the polymer, the quality of polymer has a considerable dispersion.

However, gas phase polymerization, on the other hand, has such advantages that neither recovery of solvent as in the case of slurry polymerization nor recovery of liquefied monomer as in the case of bulk polymerization is necessary, whereby raw materials are saved and the production process and equipments are simplified to reduce production cost. Such advantages, however, are exhibited when the quality of polymer is not reduced even if neither amorphous polymer (atactic polymer) nor catalyst residue is removed.

Accordingly it has been impossible for the above-mentioned prior inventions to make good use of the advantages of gas phase polymerization.

SUMMARY OF THE INVENTION

The object of the present invention is to provide a process capable of producing highly crystalline α-olefin polymers with a high yield, even by way of gas phase polymerization method where monomer concentration is relatively low, not to mention the cases by way of slurry polymerization method or bulk polymerization method, and hence a process capable of producing α-olefin polymers of high quality in a stabilized manner, without needing any post-treatment after completion of polymerization.

The present invention resides in:

a process for producing α-olefin polymers which comprises:

reacting a trivalent metal halide with a hydroxide, oxide or carbonate of divalent metals or a composite salt containing the foregoing compounds or a hydrate of divalent metal-containing compounds (these latter compounds being hereinafter referred to as divalent metal compounds)

to obtain a solid product (I);

reacting this solid product (I) with at least one kind of electron donors and at least one kind of electron acceptors, at least once and at most 10 times, and at that time, employing titanium tetrachloride at least once as said at least one kind of electron acceptors;

to obtain a solid product (II);

combining this solid product (II) with a trialkylaluminum and a reaction product of an electron donor with an electron acceptor (these substances to be combined together being hereinafter referred to as catalyst components), and at the time of this combination, subjecting a part or the whole of the catalyst components to a polymerization treatment with an α-olefin at least in the coexistence of said solid product (II) and said trialkylaluminum, to obtain a preliminarily activated catalyst; and polymerizing α-olefins in the presence of this catalyst.

DETAILED DESCRIPTION OF THE INVENTION

The components constituting the catalyst employed in the process of the present invention are as follows:

(A) Trivalent metal halide (B) Divalent metal compound (hydroxide, oxide or carbonate of divalent metals or composite salt containing the foregoing compounds or hydrate containing divalent metal(s)).

(C) Electron donor (D) Electron acceptor (E) Trialkylaluminum (F) α-Olefin (G) Reaction product of an electron donor with an electron acceptor Preparation of the catalyst employed in the present invention will be described below.

The solid product (I) is obtained by reacting a trivalent metal halide with a divalent metal compound.

As for the trivalent metal compound (A), aluminum trichloride (anhydrous), aluminum tribromide (anhydrous), ferric chloride (anhydrous), etc. are employed.

As for the divalent metal compound (B), for example, hydroxides such as $Mg(OH)_2$, $Ca(OH)_2$, $Zn(OH)_2$, $MN(OH)_2$, oxides such as MgO, CaO, ZnO, MnO, composite oxides containing divalent metal(s) such as $MgAl_2O_4$, $MgSiO_4$, $Mg_6MnO_8$, carbonates such as $MgCO_3$, $MnCO_3$, composite carbonates containing carbonates of divalent metals such as $MgCO_3.CaCO_3$, halogenated hydrates such as $SnCl_2.2H_2O$, $MgCl_2.nH_2O$ (n=1~6), $NiCl_2.6H_2O$, $MnCl_2.4H_2O$, $KMgCl_3.6H_2O$, hydrates of composite compounds consisting of a halide and a hydroxide of divalent metals such as $MgCl_2.nMg(OH)_2.mH_2O$ (n=1~3, m=1~6), hydrates of composite oxides such as $3MgO.2SiO_2.2H_2O$, hydrates of composite compounds consisting of a carbonate and a hydroxide of divalent metals such as $3MgCO_3.Mg(OH)_2.3H_2O$, hydrates of hydroxide carbonate containing divalent metals such as $Mg_6Al_2(OH)_{16}CO_3.4H_2O$, etc. are mentioned. Among them, divalent metal compounds containing magnesium are particularly preferable.

As for the preparation of the solid product (I), (1) a method of reacting a trivalent metal halide (A) with a divalent metal compound (B), while milling them together in a mill such as ball mill, vibration mill, etc., (2) a method of milling and mixing (A) and (B) together and thereafter reacting them by heating, and the like method are illustrated. As for the ratio of amounts of (A) and (B), 0.05 to 10 mols of the divalent metal compound (B) per one mol of the trivalent metal halide (A) are sufficient. In the case of reaction with milling, as for the milling reaction conditions, room temperature (20° C.) for 500° C., 5 to 100 hours in the case of ball mill and 10 minutes to 50 hours in the case of vibration mill, are sufficient. Further, in the case of milling and subsequent heating, (A) and (B) are milled for 5 to 100 hours in the case of ball mill and 10 minutes to 50 hours in the case of vibration mill, and thereafter heated at room temperature (20° C.) for 500° C. for 10 minutes to 50 hours. The solid thus obtained is referred to as solid product (I).

This solid product (I) is then reacted with at least one kind of electron donors (C) and at least one kind of electron acceptors (D) (this reaction will be hereinafter referred to as formation reaction of solid product (II)).

As for the electron donors (C) employed in the present invention, organic compounds containing at least one atom of oxygen, nitrogen, sulfur and phosphorus, such as alcohols, ethers, esters, aldehydes, organic acids, ketones, nitriles, amines, amides, urea, thioureas, isocyanates, azo compounds, phosphines, phosphites, phosphinites, thioethers, thioalcohols, polysiloxanes, etc. are employed. Among these electron donors, esters are most preferably employed. As for concrete examples of electron donors, alcohols such as methanol, ethanol, propanol, butanol, pentanol, hexanol, octanol, phenol, cresol, xylenol, ethylphenol, naphthol, ethers such as diethyl ether, di-n-propyl ether, di-n-butyl ether, diisoamyl ether, di-n-pentyl ether, di-n-hexyl ether, di-i-hexyl ether, di-n-octyl ether, di-i-octyl ether, di-n-dodecyl ether, diphenyl ether, ethylene glycol monomethyl ether, diethylene glycol dimethyl ether, tetrahydrofuran; esters such as methyl methacrylate, ethyl acetate, butyl formate, amyl acetate, vinyl lactate, vinyl acetate, ethyl benzoate, propyl benzoate, butyl benzoate, octyl benzoate, 2-ethylhexyl benzoate, methyl toluylate, ethyl toluylate, 2-ethylhexyl toluylate, methyl anisate, ethyl anisate, propyl anisate, ethyl cinnamate, methyl naphthoate, ethyl naphthoate, propyl naphthoate, butyl naphthoate, 2-ethylhexyl naphthoate, ethyl phenylacetate; aldehydes such as acetaldehyde, benzaldehyde; fatty acids such as formic acid, acetic acid, propionic acid, lactic acid, oxalic acid, succinic acid, acrylic acid, maleic acid; aromatic acids such as benzoic acid; ketones such as methyl ethyl ketone, methyl isobutyl ketone, benzophenone; nitriles such as acetonitrile; amines such as methylamine, diethylamine, tributylamine, triethanolamine, β(N,N-dimethylamino) ethanol, pyridine, quinoline, α-picoline, N,N,N',N'-tetramethyl-hexaethylenediamine, aniline, dimethylaniline; amides such as formamide, hexamethyl phosphoric acid triamide, N,N,N',N',N''-pentamethyl-N'-β-dimethylaminoethyl phosphoric acid triamide, octamethylpyrophosphoroamide; ureas such as N,N,N',N'-tetramethylurea; isocyanates such as phenylisocyanate, toluylisocyanate; azo compounds such as azobenzene; phosphines such as ethylphosphine, triethylphosphine, tri-n-butylphosphine, tri-n-octylphosphine, triphenylphosphine, triphenylphosphine oxide; phosphites such as dimethylphosphite, di-n-octylphosphite, triethylphosphite, tri-n-butylphosphite, triphenylphosphite; phosphinites such as ethyldiethylphosphinite, ethyldibutylphosphinite, phenyldiphenylphosphinite; thioethers such as diethyl thioether, diphenyl thioether, methyl phenyl thioether, ethylene sulfide, propylene sulfide; and thioalcohols such as ethyl thioalcohol, n-propyl thioalcohol, thiophenol, are mentioned.

The polysiloxanes are chain or cyclic siloxane polymers expressed by the general formula

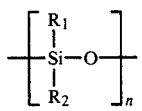

(wherein n represents 3-10,000), and $R_1$ and $R_2$ represent the same or different kinds of substituents capable of being combined to Si, and above all, those consisting of one kind of hydrogen, hydrocarbon residual group such as alkyl group, aryl group, etc., halogen, alkoxy group, aryloxy group, fatty acid residual group, etc., or those in which two kinds or more of the above-mentioned radicals or groups are distributed and combined in a molecule in various proportions may be employed.

Polysiloxanes commonly employed are those wherein each R in the above-mentioned formula is a hydrocarbon residual group, and as concrete examples, alkylsiloxane polymers such as lower polymers e.g. octamethyltrisiloxane, octaethylcyclotetrasiloxane and polymers e.g. dimethylpolysiloxane, ethylpolycyclosiloxane, methylethylpolysiloxane etc., further arylsiloxane polymers such as hexaphenylcyclotrisiloxane, diphenylpolysiloxane, and further alkylarylsiloxane polymers such as diphenyloctamethyltetrasiloxane, methylphenylpolysiloxane, etc. are illustrated.

Besides, those wherein $R_1$ is hydrogen or halogen and $R_2$ is a hydrocarbon residual group such as alkyl group, aryl group, etc., e.g. alkylhydrogensiloxane polymers, haloalkylsiloxane polymers, haloarylsiloxane polymers, etc. are illustrated. Further, polysiloxanes wherein each R is alkoxy or aryloxy group or fatty acid residual group can be also employed.

The viscosity of polysiloxanes employed is suitably in the range of 10-10,000 centistokes, preferably 10-2,000 centistokes, at 25° C.

These electron donors (C) may be also employed in admixture.

As for the electron acceptors (D), halides of elements of III group to VIII group of the Periodic Table are mentioned. For example, (D-1) aluminum chloride compounds expressed by the general formula $R_nAlCl_{3-n}$ (wherein $0 \leq n < 3$; R represents a hydrocarbon group of 1 to 20C, preferably 1 to 10), and concretely, $AlCl_3$ (anhydrous), $EtAlCl_2$, $n-PrAlCl_2$, $n-BuAlCl_2$, $i-BuAlCl_2$, $Et1.5AlCl_{1.5}$ (ethylaluminum sesquichloride), $Et_2AlCl$, $n-Pr_2AlCl$, $i-Bu_2AlCl$ (Et, Pr and Bu represent ethyl, propyl and butyl, respectively, in the above-mentioned formulas), are mentioned. Besides, (D-2) inorganic halides such as $SiCl_4$, $SnCl_2$, $SnCl_4$, $TiCl_4$, $ZrCl_4$, $PCl_3$, $PCl_5$, $VCl_4$, $SbCl_5$, $SCl_2$, $MnCl_2$, $FeCl_2$, $NiCl_2$ are mentioned. Further, (D-3) organomagnesium compounds are also employed as an electron donor (D), together with halides of (D-1) or (D-2), in the reaction with the solid product (I).

The organomagnesium compounds employed are most usually Grignard reagents, and are compounds obtained by the reaction of a halogen-containing organic compound with metallic magnesium, and expressed by the general formula $(MgR_2)_a \cdot (R'MgX)_b$ (wherein R and R' represent an alkyl group of 1 to 20 C or a phenyl group substituted or unsubstituted by an alkyl group of 1 to 10 C; X represents Cl, Br or I; and a and b represent a number of 0 to 1 and has a relationship of $a+b=1$).

In other words, Grignard reagents in a narrow sense, expressed by $R'MgX$, dialkylmagnesiums expressed by $MgR_2$ or mixtures thereof are employed. Concrete examples are as follows: halogen-containing magnesium compounds such as $CH_3MgCl$, $CH_3MgBr$, $CH_3MgI$, $C_2H_5MgCl$, $C_2H_5MgBr$, $C_2H_5MgI$, $C_3H_7MgCl$, $C_3H_7MgBr$, $C_3H_7MgI$, $C_4H_9MgCl$, $C_4H_9MgBr$, $C_4H_9MgI$, $C_5H_{11}MgCl$, $C_5H_{11}MgBr$, $C_5H_{11}MgI$, $C_6H_{13}MgCl$, $C_6H_{13}MgBr$, $C_6H_{13}MgI$, $C_7H_{15}MgCl$, $C_7H_{15}MgBr$, $C_7H_{15}MgI$, $C_8H_{17}MgCl$, $C_8H_{17}MgBr$, $C_8H_{17}MgI$, $C_9H_{19}MgCl$, $C_9H_{19}MgBr$, $C_9H_{19}MgI$, $C_{10}H_{21}MgCl$, $C_6H_5MgCl$, $C_6H_5MgBr$, $C_6H_5MgI$, $CH_3(C_6H_4)MgCl$, $CH_3(C_6H_4)MgBr$, $CH_3(C_6H_4)MgI$; dialkylmagnesium compounds such as $Mg(CH_3)_2$, $Mg(C_2H_5)_2$, $Mg(C_3H_7)_2$, $Mg(C_4H_9)_2$, $Mg(C_5H_{11})_2$, $Mg(C_6H_{13})_2$, $Mg(C_7H_{15})_2$, $Mg(C_8H_{17})_2$; and mixtures of the foregoing compounds. Among these organomagnesium compounds, Grignard reagents in a narrow sense (wherein b=1 and a=0; $R'=1 \sim 10$ C; and X=Cl or Br in the above-mentioned general formula) are preferable.

In the reaction of the electron donor (C) and the electron acceptor (D) with the solid product (I), a solvent may be employed. Further, in the case of washing or the like after the reaction, a solvent may be also employed. As such a solvent, aliphatic hydrocarbons such as n-pentane, n-hexane, n-heptane, n-octane, i-octane, n-nonane, n-decane, etc.; aromatic hydrocarbons such as benzene, toluene, xylene, ethylbenzene, cumene, etc.; and halogenated hydrocarbons such as carbon tetrachloride, chloroform, dichloroethane, trichloroethylene, tetrachloroethylene, carbon tetrabromide, chlorobenzene, orthodichlorobenzene, etc. (these will be hereinafter referred to merely as solvent) may be employed.

Next, method of reacting the electron donor (C) and the electron acceptor (D) with the solid product (I) will be mentioned.

As for the reaction state, the reaction may be carried out in suspension state in the presence or absence of solvent (such reaction will be hereinafter referred to as suspension reaction), or may be carried out under milling with a milling means such as vibration mill, ball mill, etc. (such reaction will be hereinafter referred to as milling reaction), or may be carried out in a combination of suspension reaction with milling reaction (the reaction referred to in the following description includes both of suspension reaction and milling reaction).

In the present invention, $TiCl_4$ is necessarily employed as (D). (D) or (D)s other than $TiCl_4$ are employed when a plurality of (D)s are employed. When a plurality of kinds of (D)s are employed, they may be employed in admixture, and when the reaction employing (D) is carried out twice or more, the plurality of kinds of (D)s may be employed either in admixture or separately. Either in the case of only once or in the case of twice or more, $TiCl_4$ is employed necessarily once. In such case, it is preferable to employ $TiCl_4$ alone as the (D), but a mixture of $TiCl_4$ with other electron acceptors in a mixing proportion of $TiCl_4$ of 20% by weight or more may be also employed. When $TiCl_4$ as (D) is referred to in the following description of the reaction employing (D), it includes also the above-mentioned mixture besides $TiCl_4$, alone.

Each step of the formation reaction of the solid product (II) may be carried out according to either of milling reaction or suspension reaction as mentioned above. Further, so long as the reaction of (D) contains reaction of $TiCl_4$ at least once, the formation reaction of the solid product (II) may be carried out optional reaction times (but within ten times for each of (C) and (D)), in an optional combination of reactants employed in once reaction and in an optional order of reactants. The most preferable embodiment is conducted by carrying out the reaction of TiCl$_4$ at least once, preferably twice or three times and in suspension manner at the final step of the formation reaction of the solid product (II) (such reaction will be hereinafter referred to as later step reaction), and at least before this later step reaction, subjecting other (C) and (D) (including the case of TiCl$_4$) together with the solid product (I) in a coexistent state of the total reactants (excluding TiCl$_4$ of the final step), to milling reaction, although the reaction of (C) and (D) with the solid product (I) prior to the above-mentioned coexistence may be successively carried out in any order and any times (such reaction will be hereinafter referred to as former step reaction). As for the respective reactants employed in the former step reaction, a part or the whole thereof may be in advance converted into a reaction product of the solid product (I) with (D) (including the case of TiCl$_4$) or a reaction product of (C) with (D) by way of milling reaction or suspension reaction, and such reaction products may be employed. In the later step reaction, (C) or (D) excluding TiCl$_4$ may be made coexistent with TiCl$_4$.

As for another embodiment of the formation reaction of the solid product (II), for example, it is possible to subject the total reactants including TiCl$_4$ to milling reaction or suspension reaction.

Although TiCl$_4$ is employed as (D) at least once in the formation reaction of the solid product (II), as mentioned above, even when TiCl$_4$ alone is employed as (D), that is, no other (D) is employed, effectiveness is exhibited in the present invention. However, simultaneous use of TiCl$_4$ with other (D) is more effective and preferable.

In case where an organomagnesium compound other than TiCl$_4$ is reacted as (D) with the reaction product (I), it is preferable to employ it not singly but together with other electron acceptors in an amount of at least 10% by weight. The reaction of such organomagnesium compounds and other electron acceptors with the solid product (I) may be carried out either separately or simultaneously.

The amounts of (C) and (D) to be reacted with the solid product (I), employed per once, are both usually 5 to 50 g based on 100 g of the solid product (I).

However, in case where suspension reaction is carried out, it is preferable to adjust the slurry concentration to 5 to 50% by weight. For this adjustment, the amount of liquid reactant employed may be increased, and further, a solvent may be employed in place of a part or the whole of the increment. In the reaction of TiCl$_4$ which is preferably carried out at least once in suspension manner at the final step, as mentioned above, its amount employed is particularly increased, that is, it is preferable to employ an amount of 100 to 5,000 g based on 100 g of the solid product (I) and also a slurry concentration of 2 to 50% by weight. For the adjustment of the slurry concentration, a solvent may be employed at the same time.

As for the conditions for the respective reaction steps of the formation reaction of the solid product (II), the reaction temperature is in the range of 0° to 500° C., preferably 20° to 200° C., and the reaction time has suitable ranges depending on the reaction state, that is, a range of one minute to 10 hours in the case of suspension reaction, and a range of 5 to 200 hours in the case of milling reaction with ball mill, while a range of 10 minutes to 50 hours in the case of milling reaction with vibration mill. Reaction conditions in case where an electron donor is reacted with an electron acceptor in advance, are same as those for the reaction product of (G) mentioned later.

The solid product (II) obtained as mentioned above is taken out from the reaction liquid, after completion of its formation reaction, by removing unreacted (C) and (D) from the reaction liquid by means of distilling off them under reduced pressure or the atmospheric pressure, or filtration or decantation or washing with solvent, followed by drying, and thereafter employed for the subsequent reaction. Alternatively, a solvent is added to the reaction liquid after said washing to form a suspension, which is then, as it is, employed for the subsequent reaction.

The solid product (II) is then combined with (E) a trialkylaluminum and (G) a reaction product of an electron donor with an electron acceptor to form a catalyst component, and a part or the whole of this catalyst component is subjected to a polymerization treatment with an α-olefin, at least in the coexistence of the solid product (II) and (E), to form a preliminarily activated catalyst, which is then employed as a catalyst for polymerizing α-olefins. The "polymerization treatment" referred to in the present invention means that a small amount of an α-olefin is contacted with the catalyst component under polymerizable conditions to polymerize the α-olefin. As a result of this polymerization treatment, the catalyst component forms a state where it is coated with the polymer of the α-olefin.

As for the trialkylaluminum employed in the present invention, trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum, tri-n-decylaluminum, etc. are mentioned.

The reaction product (G) of an electron donor with an electron acceptor, to be combined with the solid product (II) (which reaction product will be hereinafter abbreviated to (G) or reaction product (G)), is prepared as follows (as for such electron donor and electron acceptor, any of the electron donors and electron acceptors described above as those to be combined with the solid product (I) may be employed): (C) (100 g) is reacted with (D) (10 to 500 g) employing a solvent (0 to 500 ml), at −5° C. to 200° C. for one minute to 5 hours. After completion of the reaction, the reaction liquid may be employed, as it is, for the subsequent reaction, or a portion or the whole of unreacted (C), unreacted (D) and solvent may be removed from the reaction liquid by means of filtering-off, decantation, vacuum drying, etc. to take out the resulting reaction product in the form of a solid or an oily substance, which is then employed for the subsequent reaction.

As for α-olefins employed for the preliminary activation, straight chain monoolefins such as ethylene, propylene, butene-1, hexene-1, heptene-1, octene-1, decene-1, etc., branched chain monoolefins such as 4-methylpentene-1, 2-methyl-pentene-1,3-methyl-butene-1, etc. and styrene, etc. are mentioned. These α-olefins may be same as or different from those to be polymerized employing the preliminarily activated catalyst.

The polymerization treatment may be carried out in any one of a hydrocarbon solvent such as propane, butane, n-pentane, n-hexane, n-heptane, n-octane, benzene, toluene, etc., a liquefied α-olefin such as liquefied propylene, liquefied butene-1, etc. and ethylene or propylene gas, and hydrogen may be made coexistent at the time of the treatment.

The amounts of the substances employed for the preparation of the catalyst for the preliminary activation are as follows: 0.5 to 500 g, preferably 1 to 50 g, of trialkylaluminum (E), 1 to 20 g of reaction product (G), less than 5,000 g, preferably 0.1 to 1,000 g of α-olefin (F), 0 to 10 l of hydrogen and 0 to 80 l of solvent, these being all based on 1 g of the solid product (II). In the preliminary activation including the polymerization treatment, the addition of the catalyst components, α-olefin, etc. and the reaction are carried out at 0° C. to 100° C., preferably 10° C. to 70° C. In the polymerization treatment, an α-olefin is reacted in an amount of 0.1 to 500 g per g of the solid product (II). The time of the polymerization treatment is suitably in the range of one minute to 5 hours. The polymerization treatment may be also carried out in the presence of α-olefin polymer particles in an amount of 0 to 5,000 g per g of the solid product (II). In the addition and mixing of various catalyst components at the time of the preliminary activation, or in the polymerization treatment, stirring is carried out if necessary.

If the whole of the catalyst components are present in the final polymerization treatment, at the point of this final polymerization treatment, while if a certain catalyst component is not yet present, at the point where the catalyst component is added, preparation of the preliminarily activated catalyst is complete.

As for the method of the preliminary activation, various ones are mentioned such as (1) a method of adding (E) (trialkylaluminum), the solid product (II) and (G) (reaction product) in any order, followed by reaction with ($F_1$) (α-olefin);

(2) a method of mixing (E) with the solid product (II), thereafter reacting them with ($F_1$) and thereafter adding (G);

(3) a method of adding (E), ($G_1$) and the solid product (II) in any order, reacting them with ($F_1$) and thereafter adding ($G_2$);

(4) a method of carrying out the method (1), (2) or (3) and thereafter further adding ($F_2$), followed by reaction;

(5) a method of carrying out the above-mentioned method (1), (2), (3) or (4) in the presence of an α-olefin polymer prepared in advance; and (6) a method of employing hydrogen together with ($F_1$) and/or ($F_2$), in the above-mentioned method (1), (2), (3), (4) or (5). The above mentioned ($G_1$) and ($G_2$), and ($F_1$) and ($F_2$) may be same or different, respectively. When (F), (G), etc. are reacted twice or more, the above-mentioned amounts are employed in portions. In the above-mentioned methods, (C) may be added at an optional time. In these methods, when the solid product (II) has reached a coexistent state with (E) and (F), the polymerization treatment is carried out.

After the preliminary activation and subsequent removal of unreacted α-olefin and solvent, the resulting preliminarily activated catalyst may be dried into powder, or suspended in a solvent in an amount not more than 80 l per g of the solid product (II).

The preliminarily activated catalyst thus prepared is employed for producing α-olefin polymers.

It is possible to employ this catalyst either for slurry polymerization carried out in a hydrocarbon solvent such as n-hexane, n-heptane, etc. or for bulk polymerization carried out in a liquefied α-olefin such as liquefied propylene, liquefied butene, etc. However, due to the high activity of the catalyst, a particularly notable effectiveness is brought about in the case of gas phase polymerization where an α-olefin such as propylene is polymerized in gas phase. A superior effectiveness is also brought about in the case of a modification of gas phase polymerization where slurry polymerization or bulk polymerization is carried out followed by gas phase polymerization.

In the present invention, gas phase polymerization may be carried out in any manner of fluidization by means of fluidized bed, fluidization with stirring blades, and vertical type or horizontal type paddle stirring. Further, either continuous polymerization or batch polymerization may be employed.

The above-mentioned modification of gas phase polymerization where gas phase polymerization is carried out after slurry or bulk polymerization may be carried out either batchwise or continuously. For example, there are (1) a method of carrying out slurry or bulk polymerization, thereafter removing solvent or liquefied α-olefin and successively carrying out gas phase polymerization, and (2) a method of carrying out slurry or bulk polymerization and continuing α-olefin polymerization without removing solvent or α-olefin, during which polymer particles increase to occlude the solvent or liquefied α-olefin therein and cause the liquid portion to disappear, and the slurry or bulk polymerization moves, without applying any particular operation, to gas phase polymerization where an α-olefin is fed in the form of gas. Polymerization in a plurality of steps, consisting of a combination of slurry or bulk polymerization with gas phase polymerization affords desirable results particularly in continuation polymerization. As for an embodiment thereof, slurry or bulk polymerization is carried out in the first step. The polymerization is continued until polymer particles containing 30% or less of solvent or liquefied α-olefin are obtained, or solvent or liquefied α-olefin is removed, and thereafter gas phase polymerization of α-olefin is carried out in the second step by fluidizing the polymer particles. In the second step gas phase polymerization, the catalyst of the first step is used as it is, but addition of a fresh catalyst in the second step does not hinder the effectiveness of the present invention. In this case, as for the proportion of the slurry or bulk polymerization to the gas phase one, it is preferable to carry out polymerization in a ratio by weight of the former to the latter of $1:0.1 \sim 100$ (by weight).

In carrying out the present invention by slurry or bulk polymerization, it is possible to remove solvent or liquefied monomer after completion of the polymerization, not by filtration or decantation but by distillation. The reason is that even if amorphous polymer remains, as it is, in the resulting product polymer, practically sufficient physical properties are retained since the amount of the amorphous polymer is small and also the product polymer has a high rigidity.

As for the polymerization conditions, any of slurry polymerization, bulk polymerization and gas phase polymerization may be carried out at a polymerization temperature of room temperature (20° C.) to 200° C., at a polymerization pressure of the atmospheric pressure (0 kg/cm²G) to 50 kg/cm²G and for a polymerization time of 5 minutes to 10 hours. Further, in the polymerization, conventional means such as addition of a suitable amount of hydrogen may be employed.

As for the α-olefins employed in the process of the present invention, straight chain monoolefins such as ethylene, propylene, butene-1, hexene-1, octene-1, etc., branched chain monoolefins such as 4-methyl-pentene-1, 2-methyl-pentene-1, 3-methyl-butene-1, etc., diolefins such as butadiene, isoprene, chloroprene, etc., styrene, etc. are mentioned. These olefins may be homopolymerized or copolymerized in combination with each other, for example, in combination of propylene with ethylene; butene with ethylene; and propylene with butene-1. In this case, they may be polymerized in admixture of monomers or in a plurality of steps where different α-olefins may be employed in the first step slurry or bulk polymerization and the second step gas phase polymerization.

The first effectiveness of the present invention is that highly crystalline polymers are obtained. For example, in the case of polypropylene, even when atactic polypropylene is not removed, the resulting polypropylene has a value of 0.90 to 0.935 in terms of absorbance ratio of absorptions at 995 cm$^{-1}$ and 974 cm$^{-1}$ as measured by infrared absorption method. This ratio is referred to as IR$\lambda$ and will be explained later in respect of its measurement method.

The second effectiveness thereof is that the resulting α-olefin polymers have a high rigidity. For example, they have a bending modulus (according to JIS K-7203) in the range of 1.1 to 1.3$\times 10^4$ kg/cm$^2$; hence their application fields can be extended.

The third effectiveness thereof is that the percentage of amorphous polymer (amorphous polypropylene in the case of polypropylene) formed is reduced. For example, in the case of polypropylene, the amount of atactic polypropylene as a hexane-soluble (20° C.) is reduced down to 2 to 4%. Due to this reduction and the above-mentioned high rigidity (the second effectiveness), even when amorphous polymer is allowed to remain in the product polymer, the physical properties of the polymer are sufficient for practical uses; hence in any case of slurry polymerization, bulk polymerization, gas phase polymerization and slurry or bulk polymerization followed by gas phase polymerization, it is unnecessary to remove amorphous polymer after completion of the polymerization, whereby effectiveness of reduction in polymer loss and simplification of production steps, production apparatuses, etc. is exhibited.

In the present invention, beside the above-mentioned effectivenesses, the effectiveness of the prior invention (6) is retained to the same extent or exhibited more, such that the catalyst has a high stability; the polymer yield is high; the transition metal is effectively utilized; the molecular weight distribution can be adjusted so as to give a narrow one; the polymer has a good shape; etc. The effectiveness will be mentioned below in more detail.

Namely, the fourth effectiveness of the present invention is that the catalyst has a high stability. For example, even when the preliminarily activated catalyst is allowed to stand in a catalyst tank for about one week, before it is employed for polymerization, no bad influences such as notable reduction in polymerization activity, notable reduction in crystallinity, inferiority of powder form, etc. are observed.

The fifth effectiveness thereof is that the catalyst has an exceedingly high activity to give a high yield of α-olefin polymers. Namely, the polymer yield per g of the solid product (II) amounts to 5,000 to 20,000 g in the case of slurry or bulk polymerization, while it amounts to 5,000 to 15,000 g (polymer) even in the case of gas phase polymerization where the monomer concentration is relatively low. Thus, even in the case of gas phase polymerization, not to mention the case of slurry or bulk polymerization, it is possible to reduce the amount of catalyst; hence even when killing of catalyst or purification of polymer after completion of polymerization, is abbreviated, polymer is not colored and also no bad influences such as degradation of physical properties of polymer, rusting of mold at the time of polymer molding, etc. are observed, and further it is possible to abbreviate purification process of polymer.

The sixth effectiveness thereof is that the transition metal is very effectively utilized. For example, in the case of propylene polymerization, the polymer yield amounts to $1 \times 10^4 \sim 2.0 \times 10^6$ g (polymer)/g of transition metal atom.

The seventh effectiveness thereof is that the molecular weight distribution can be adjusted so as to give a narrow one. For example, adjustment to between 3.5 and 7.0 in terms of $\overline{M}_w/\overline{M}_n$.

The eighth effectiveness is that the polymer particles obtained have a good form, and also have a bulk density (BD) of 0.35 to 0.45.

The nineth effectiveness is that even in the case of gas phase polymerization, a sufficiently high yield is obtained; removal of amorphous polymer and removal of catalyst residue in the product polymer are unnecessary; no cohesion of polymer particles is observed during the polymerization, to make smooth the discharge of polymer from the polymerization vessel and its transportation and enable a long time stabilized continuous operation, whereby specific features intrinsic of gas phase polymerization can be exhibited. Namely, the specific features of gas phase polymerization that recovery and reuse of solvent and monomer can be minimized to reduce the costs of recovery and reuse and hence reduce the production cost of polymer, can be fully exhibited. Further, since the yield of polymer at the gas phase polymerization part is increased, a modification of gas phase polymerization, i.e. a process of slurry or bulk polymerization followed by gas phase polymerization, can be effectively carried out. Accordingly, since gas phase polymerization is carried out in the latter step, it is possible to elevate the polymer concentration up to 70% or higher in the slurry or bulk polymerization of the former step, followed by gas phase polymerization; hence, in the gas phase polymerization of the latter step, it is possible to effectively vaporize unreacted monomer through polymerization reaction heat. Particularly in the case of bulk polymerization followed by gas phase polymerization, a notable effectiveness can be exhibited on the effective utilization of polymerization reaction heat.

Definitions and measurement methods of physical properties referred to in the following Examples will be shown below.

(i) Atactic index

Ten grams of a polymer is extracted within 200 ml of n-hexane at 20° C. with stirring for 48 hours and then separated by filtration into a n-hexane-soluble polymer (e.g. atactic polypropylene) and a n-hexane-insoluble polymer (e.g. isotactic polypropylene), followed by drying. Atactic index is given according to the following equation:

$$\text{Atactic index } (\%) = \frac{\text{Amount of atactic polymer (g)}}{\text{Amount of isotactic polymer (g) + amount of atactic polymer (g)}} \times 100$$

(ii) Molecular weight distribution

A polymer is dissolved in o-dichlorobenzene as solvent so as to give a concentration of 0.1 to 0.5%. The resulting solution is subjected to measurement of molecular weight distribution ($\overline{M}_w/\overline{M}_n$), employing GPC 200 Type manufactured by Waters Co., at 140° C. and at a flow rate of 1 ml/min. ($\overline{M}_w$: weight average molecular weight, $M_n$: number average molecular weight).

(iii) IR-$\tau$

A polymer annealed at 135° C. for 120 minutes is subjected to measurement of IR-$\tau$ according to Luongo's method (see J. P. Luongo, J. Appl. Polymer Sci., 3, 302 (1960)).

(iv) Bending modulus

Measurement is carried out according to JIS K-7203.

(v) BD

This (bulk density of polymer) is expressed by the number of grams per c.c. of apparent volume.

(vi) MFR

This (melt flow rate) is measured according to ASTM D-1238 (L).

EXAMPLE 1

(1) Preparation of solid product (II)

Aluminum trichloride (anhydrous) (133 g) was reacted with magnesium oxide (40 g) under milling by means of a vibration mill at 250° C. for 3 hours, followed by cooling and taking out of the mill to obtain a solid product (I).

This solid product (I) (100 g) and a reaction product obtained by reacting 30 g of ethyl benzoate with 15 g of silicon tetrachloride at 20° C. for 30 minutes, were introduced into a ball mill having an inner diameter of 200 mm and a capacity of 4.7 l and containing 100 balls of 15 mm in diameter, and subjected to milling reaction at room temperature (20° C.) for 48 hours. The solid thus obtained (100 g) was suspended in 900 g of titanium tetrachloride and then reacted together at 80° C. for 2 hours, followed by removing 700 g of titanium tetrachloride containing soluble matters as they are, by filtration.

Thereto were further added 800 g of titanium tetrachloride, and they were suspended. After this suspension was maintained at 80° C. for 30 minutes, titanium tetrachloride containing soluble matters was removed by filtration, followed by repeating washings followed by filtrations 4 times, each with 1,000 ml of n-hexane, and drying to obtain a solid product (II). The Ti atom content in 1 g of this solid product (II) was 12 mg.

(2) Preparation of preliminarily activated catalyst (2-1) Preparation of reaction product (G)

Into a 500 ml, 3-neck flask were introduced 300 ml of n-hexane, 30 g of methyl p-toluylate and further 26 g of aluminum trichloride (anhydrous), and they were heated together at 70° C. for one hour, followed by cooling down to 20° C., and filtration, washing and drying in a dry box purged with nitrogen, to obtain 55 g of a solid product (G).

(2-2) Preparation of preliminarily activated catalyst

A 30 ml capacity stainless steel reaction tube equipped with slant blades was purged with nitrogen gas and then 800 ml of n-hexane, 4.56 g of triethylaluminum and 0.288 g of the solid product (II) were added. Propylene was fed at room temperature (20° C.), under a partial pressure of 1 kg/cm$^2$G for 10 minutes (the amount of propylene polymerized was 0.9 g/g of solid product (II), followed by adding 1.76 g of the above-mentioned solid product (G) to prepare a preliminarily activated catalyst.

(3) Polymerization of propylene

The above-mentioned catalyst thus prepared was allowed to stand for 6 hours, as it was. Hydrogen (4,800 ml) was introduced into the reaction tube, and gas phase polymerization was carried out employing the catalyst, under a partial pressure of propylene of 25 kg/cm$^2$G at 70° C. for 2.5 hours. After completion of the polymerization, 80 g of methanol was introduced to carry out killing reaction at 70° C. for 10 minutes, followed by cooling down to room temperature (20° C.) and drying the contents as they were, to obtain 4.176 kg of a polymer of white powder. The polymer yield (total polymer) per g of solid product (II) was 14,500 g. This polymer had an atactic index of 2.0, a value of $\overline{M}_w/\overline{M}_n$ of 4.1, an IR-$\tau$ of 0.93, a bending modulus of $1.30\times10^4$ kg/cm$^2$, a BD of 0.48 and a MFR of 4.3.

COMPARATIVE EXAMPLE 1

Preparation and still standing of catalyst and polymerization of propylene were carried out in the same manner as in Example 1 except that the reaction product (G) was not employed in the preparation of the preliminarily activated catalyst (which will be referred to merely as catalyst preparation).

COMPARATIVE EXAMPLES 2 AND 3

Preparation and still standing of catalyst and polymerization of propylene were carried out in the same manner as in Example 1 except that methyl p-toluylate was employed in an amount of 0.928 g (Comparative example 2) or 1.76 g (Comparative example 3) in place of the reaction product (G), in the catalyst preparation.

COMPARATIVE EXAMPLES 4 AND 5

Preparation and still standing of catalyst and polymerization of propylene were carried out in the same manner as in Example 1 except that aluminum trichloride was employed in an amount of 0.832 g (Comparative example 4) or 1.76 g (Comparative example 5), in place of the reaction product (G), in the catalyst preparation.

COMPARATIVE EXAMPLE 6

Preparation and still standing of catalyst and polymerization of propylene were carried out in the same manner as in Example 1 except that after the solid product (II) was combined with triethylaluminum, the reaction product (G) was added without feeding propylene, in the catalyst preparation.

The results of Example 1 and Comparative examples 1~6 are shown in Table 1.

TABLE 1

| No. | Ti content in solid product (II) (mg/g) | Polymer yield (g) per g of solid product (II) | Polymer yield (g) per g of Ti atom ($\times 10^5$) | IR-$\tau$ | Bending modulus ($\times 10^4$ kg/cm$^2$) | Atactic index | $\overline{M_w}/\overline{M_n}$ | BD | MFR |
|---|---|---|---|---|---|---|---|---|---|
| Example 1 | 12.0 | 14,500 | 12.0 | 0.93 | 1.30 | 2.0 | 4.1 | 0.48 | 4.3 |
| Comparat. ex. 1 | 12.0 | 2,200 | 1.8 | 0.74 | 0.71 | 24.0 | 13.0 | 0.15 | 4.1 |
| Comparat. ex. 2 | 12.0 | 7,500 | 6.3 | 0.86 | 0.89 | 3.0 | 5.1 | 0.45 | 4.2 |
| Comparat. ex. 3 | 12.0 | 2,100 | 1.8 | 0.89 | 0.91 | 3.0 | 5.0 | 0.44 | 4.3 |
| Comparat. ex. 4 | 12.0 | 2,300 | 1.9 | 0.80 | 0.85 | 18.0 | 9.4 | 0.25 | 4.3 |
| Comparat. ex. 5 | 12.0 | 1,400 | 1.2 | 0.80 | 0.85 | 14.0 | 9.2 | 0.20 | 4.2 |
| Comparat. ex. 6 | 12.0 | 3,800 | 3.2 | 0.85 | 0.89 | 5.4 | 6.0 | 0.41 | 4.2 |

EXAMPLE 2 n-Hexane (320 ml), triisobutylaluminum (6.4 g), reaction product (G) of Example 1 (0.24 g) and solid product (II) obtained in Example 1 (0.336 g) were introduced into the same reaction tube as in Example 1, and propylene was fed under a partial pressure of propylene of 2 kg/cm$^2$G, at 40° C. for 5 minutes to polymerize 4.3 g of propylene per g of the solid product (II). Further, 1.328 g of the same reaction product (G) was added to obtain a preliminarily activated catalyst, which was allowed to stand for 10 hours and then subjected to propylene polymerization in the same manner as in Example 1, (3).

EXAMPLE 3 n-Pentane (960 ml), polypropylene powder previously obtained by slurry polymerization (160 g), tri-n-butylaluminum (6.08 g), ethyl p-anisate (0.288 g) and the solid product (II) obtained in Example 1 (0.512 g) were added, and propylene was fed under 4 kg/cm$^2$G at 15° C. for 30 minutes to polymerize 12 g of propylene per g of the solid product (II). After purge of unreacted propylene, 1.44 g of the reaction product (G) of Example 1 was added and thereafter the solvent was removed under reduced pressure to obtain a preliminarily activated catalyst in the form of powder, followed by still standing of the catalyst and propylene polymerization as in Example 1, (3).

EXAMPLE 4 n-Pentan (1,920 ml), triethylaluminum (4.48 g), the reaction product (G) of Example 1 (1.888 g) and the solid product (II) of Example 1 (0.384 g) were mixed together, and propylene was then fed under 5 kg/cm$^2$G at 50° C. for 10 minutes to react 120 g of propylene per g of the solid product (II). Unreacted propylene and solvent were then removed under reduced pressure to obtain a preliminarily activated catalyst in the form of powder, followed by still standing of the catalyst and propylene polymerization as in Example 1, (3).

EXAMPLE 5 n-Hexane (800 ml), tri-n-octylaluminum (6.4 g) and the solid product (II) of Example 1 (0.384 g) were mixed together. Hydrogen (240 ml) was then added and propylene was reacted under 0.5 kg/cm$^2$G at 20° C. for 60 minutes (the amount of propylene reacted being 2.4 g based on g of the solid product (II). The reaction product (G) of Example 1 (1.632 g) was then added to obtain a preliminarily activated catalyst, followed by still standing of the catalyst and propylene polymerization as in Example 1, (3).

EXAMPLE 6

The reaction product (G) of Example 1 (0.5 g), triethylaluminum (2.0 g) and the solid product (II) obtained in Example 1 (0.300 g) were added to n-hexane (320 ml), and propylene was fed under a partial pressure of propylene of 0.1 kg/cm$^2$G, at 30° C., for 120 minutes to polymerize 120 g of propylene per g of the solid product (II). Further, the same reaction product (G) (0.4 g) was added, and propylene was fed under a partial pressure of 0.1 kg/cm$^2$G, at 30° C. for 60 minutes to further polymerize 80 g of propylene per g of the solid product (II). A preliminarily activated catalyst was obtained. Still standing of the catalyst and propylene polymerization were carried out as in Example 1, (3).

EXAMPLE 7

Triethylaluminum (3.684 g) and the solid product (II) obtained in Example 1 (0.240 g) were introduced into n-hexane (16 l), and then ethylene was reacted under a partial pressure of ethylene of 1 kg/cm$^2$G, at 70° C. for 5 minutes to react 30 g of ethylene per g of the solid product (II). The reaction product (G) of Example 1 (1,360 g) was then added to obtain a preliminarily activated catalyst, and successively (without still standing of the catalyst), 2,880 ml of hydrogen was introduced. Propylene slurry polymerization was then carried out under a partial pressure of propylene of 10 kg/cm$^2$G, at 70° C. for 2 hours, followed by removing n-hexane by steam distillation to obtain a polymer.

EXAMPLE 8

Propylene was polymerized as in Example 7 except that, in the preparation of the preliminarily activated catalyst, 48 g of butene-1 was fed in place of reaction of ethylene under a partial pressure of 1 kg/cm²G of ethylene, to react 2.3 g of butene-1 per g of the solid product (II).

The results of the above Examples 2~8 are shown in Table 2.

TABLE 2

| No. | Ti content in solid product (II) (mg/g) | Polymer yield (g) per g of solid product (II) | Polymer yield (g) per g of Ti atom ($\times 10^5$) | IR-$\tau$ | Bending modulus ($\times 10^4$ kg/cm²) | Atactic index | $\overline{M_w}/\overline{M_n}$ | BD | MFR |
|---|---|---|---|---|---|---|---|---|---|
| Example 2 | 12.0 | 12,800 | 10.7 | 0.92 | 1.28 | 2.1 | 4.5 | 0.44 | 4.3 |
| Example 3 | 12.0 | 9,200 | 7.7 | 0.91 | 1.25 | 2.3 | 4.6 | 0.41 | 4.2 |
| Example 4 | 12.0 | 7,600 | 6.3 | 0.90 | 1.10 | 3.0 | 5.0 | 0.35 | 4.2 |
| Example 5 | 12.0 | 11,000 | 9.2 | 0.92 | 1.28 | 2.2 | 4.5 | 0.41 | 4.1 |
| Example 6 | 12.0 | 13,200 | 11.0 | 0.93 | 1.30 | 2.1 | 4.5 | 0.42 | 4.8 |
| Example 7 | 12.0 | 14,200 | 11.8 | 0.92 | 1.24 | 2.2 | 4.5 | 0.43 | 4.1 |
| Example 8 | 12.0 | 13,200 | 11.0 | 0.92 | 1.27 | 2.1 | 4.2 | 0.44 | 4.0 |

EXAMPLE 9

The reaction product (G) was prepared as in Example 1, (2) except that 30 g of ethyl p-anisate were employed in place of methyl p-toluylate. Preparation of the preliminarily activated catayst, its still standing and propylene polymerization were carried out as in Example 1 except that 2.24 g of the product obtained above was employed as the reaction product (G).

EXAMPLE 10 n-Hexane (100 ml), monoethylaluminum dichloride (12.7 g) and ethyl benzoate (15.0 g) were added and reacted together at 20° C. for 30 minutes, followed by distilling off n-hexane under reduced pressure to obtain a reaction product (G). Preparation of the preliminarily activated catalyst, its still standing and propylene polymerization were carried out as in Example 1 except that 1.568 g of the product obtained above was employed as the reaction product (G) in the preparation of catalyst.

EXAMPLE 11

Preparation of the preliminarily activated catalyst, its still standing and propylene polymerization were carried out as in Example 1 except that 17 g of SiCl₄ was reacted with 15 g of methyl p-toluylate at 30° C., for 4 hours, to give a reaction product which was then, as it was, employed as (G) in an amount of 1.504 g in the preparation of catalyst.

EXAMPLE 12

Methyl p-toluylate (15.0 g) was added to n-BuMgCl (11.6 g) suspended in n-heptane (100 ml), and they were reacted together at 80° C. for 2 hours, followed by cooling, filtration and drying to obtain a reaction product (G). Preparation of the preliminarily activated catalyst, its still standing and propylene polymerization were carried out as in Example 1 except that the product obtained above was employed as the reaction product (G) in an amount of 1.312 g in the preparation of catalyst.

EXAMPLE 13

Methyl alcohol (3 g) and methyl benzoate (13.6 g) were dissolved in n-hexane (100 ml). Aluminum trichloride (anhydrous) (27 g) was then added, and they were reacted together at 60° C. for 2 hours, followed by cooling, filtration and drying to obtain 45 g of a reaction product (G). Preparation of the preliminarily activated catalyst, its still standing and propylene polymerization were carried out as in Example 3 except that the product obtained above was employed as the reaction product (G) in an amount of 1.504 g in the preparation of catalyst.

EXAMPLE 14

Preparation of the preliminarily activated catalyst, its still standing and propylene polymerization were carried out as in Example 13 except that 3 g of di-n-butyl ether were employed in place of methyl alcohol, in the preparation of the reaction product (G).

The results of the above Examples 9~14 are shown in Table 3.

TABLE 3

| No. | Ti Content in solid product (II) (mg/g) | Polymer yield (g) per g of solid product (II) | Polymer yield (g) per g of Ti atom ($\times 10^5$) | IR-$\tau$ | Bending modulus ($\times 10^4$ kg/cm²) | Atactic index | $\overline{M_w}/\overline{M_n}$ | BD | MFR |
|---|---|---|---|---|---|---|---|---|---|
| Example 9 | 12.0 | 12,000 | 10.0 | 0.92 | 1.29 | 2.1 | 4.2 | 0.40 | 4.2 |
| Example 10 | 12.0 | 11,500 | 9.6 | 0.92 | 1.27 | 2.3 | 4.1 | 0.42 | 4.3 |
| Example 11 | 12.0 | 12,200 | 10.2 | 0.93 | 1.30 | 2.1 | 4.1 | 0.44 | 4.3 |
| Example 12 | 12.0 | 11,400 | 9.5 | 0.92 | 1.27 | 2.4 | 4.3 | 0.42 | 4.1 |

TABLE 3-continued

| No. | Ti Content in solid product (II) (mg/g) | Polymer yield (g) per g of solid product (II) | Polymer yield (g) per g of Ti atom (× 10⁵) | IR-τ | Bending modulus ($\times 10^4$ kg/cm²) | Atactic index | $\overline{M_w}/\overline{M_n}$ | BD | MFR |
|---|---|---|---|---|---|---|---|---|---|
| Example 13 | 12.0 | 13,700 | 11.4 | 0.93 | 1.30 | 2.0 | 4.0 | 0.43 | 4.2 |
| Example 14 | 12.0 | 12,400 | 10.3 | 0.93 | 1.30 | 2.0 | 4.3 | 0.44 | 4.3 |

EXAMPLE 15

Dimethylpolysiloxane (Toshiba Silicone Oil TSF-45-100, a trade mark of product made by Toshiba Co.; viscosity, 100 centistokes) (74 g) was dropped into 1 l of a tetrahydrofuran solution containing ethylmagnesium chloride ($C_2H_5MgCl$) (88 g), and they were reacted together at 50° C. for 30 minutes, followed by removing tetrahydrofuran under reduced pressure to obtain a reaction product. The solid product (I) obtained in Example 1 (100 g), the above-mentioned reaction product (25 g) and ethyl benzoate (40 g) were subjected to milling reaction with a ball mill for 24 hours. Further, silicon tetrachloride (20 g) was added, followed by milling reaction for 24 hours, and further adding $TiCl_4$ (40 g) followed by milling reaction for 4 hours. The resulting solid was suspended in 500 ml of n-hexane at 60° C., followed by washing at 60° C. and drying to obtain a solid product (II). Preparation of preliminarily activated catalyst, its still standing and propylene polymerization were carried out as in Example 1, (2) and (3) (the reaction product (G) employed was same as in Example 1).

EXAMPLE 16

Preparation of the preliminarily activated catalyst, its still standing and propylene polymerization were carried out as in Example 1 except that 40 g of isopropyl benzoate were employed in place of ethyl benzoate in the preparation of the solid product (II).

EXAMPLE 17

Preparation of the preliminarily activated catalyst, its still standing and propylene polymerization were carried out as in Example 1 except that 10 g of tin tetrachloride were employed in place of silicon tetrachloride in the preparation of the solid product (II).

EXAMPLE 18

Preparation of the preliminarily activated catalyst, its still standing and propylene polymerization were carried out as in Example 1 except that 150 g of the solid product (I) obtained in Example 1 were suspended in 1,000 g of $TiCl_4$, and they were reacted together at 80° C. for 2 hours to give a solid product, which was employed in an amount of 100 g as the solid product (II), while the reaction product (G) obtained in Example 11 was employed in an amount of 40 g as the solid product (G) in this Example.

EXAMPLE 19

Cumyl alcohol (5 g) and methyl p-toluylate (25 g) were added to the solid product (I) obtained in Example 1 (100 g), and they were subjected to milling reaction with a ball mill at 30° C., for 10 hours. Silicon tetrachloride (45 g) was further added and they were further subjected to milling reaction at 30° C. for 40 hours. The resulting solid (100 g) was suspended in $TiCl_4$ (1,000 g), and they are were reacted together at 120° C. for 2 hours, followed by removing the supernatant liquid by decantation, washings three times each with 500 ml of trichloroethylene and drying to obtain a solid product (II). Preparation of the preliminarily activated catalyst, its still standing and propylene polymerization were carried out as in Example 1, (2) and (3).

EXAMPLE 20

To the solid product (I) obtained in Example 1 (100 g) was added a reaction product obtained by reacting n-butylmagnesium chloride (n-$C_4H_9MgCl$) (20 g) and ethyl p-anisate (30 g) with silicon tetrachloride (22 g) at 30° C. for 40 minutes, and they were subjected to a milling reaction at 35° C. for 20 hours to give a solid. This solid (100 g) was introduced into a solution consisting of $TiCl_4$ (200 g) and toluene (800 g), and they were reacted together at 70° C. for 4 hours, followed by removing the supernatant liquid by decantation, filtration, washings three times each with 500 ml of n-hexane and drying to give a solid product (II). Preparation of the preliminarily activated catalyst, its still standing and propylene polymerization were carried out as in Example 1, (2) and (3).

EXAMPLE 21

To the solid product (I) obtained in Example 1 (100 g) was added a complex of ethyl p-anisate and $TiCl_4$ (1:1) (8 g), and they were subjected to milling reaction with a ball mill at room temperature for 96 hours to obtain a solid product (II). Preparation of the preliminarily activated catalyst, its still standing and propylene polymerization were carried out as in Example 1, (2) and (3).

EXAMPLE 22

Preparation of the preliminarily activated catalyst, its still standing and propylene polymerization were carried out as in Example 1 except that benzoic acid alone was employed in place of the reaction product of ethyl benzoate with silicon tetrachloride, in the preparation of the solid product (II).

COMPARATIVE EXAMPLE 7

Preparation of the preliminarily activated catalyst, its standing and propylene polymerization were carried out as in Example 1 except that no solid product (I) was employed in the preparation of the solid product (II).

COMPARATIVE EXAMPLE 8

Preparation of the preliminarily activated catalyst, its still standing and propylene polymerization were carried out as in Example 1 except that silicon tetrachloride alone was employed in place of the reaction product of ethyl benzoate with silicon tetrachloride in the preparation of the solid product (II).

The results of the above Examples 15~22 and Comparative examples 7 and 8 are shown in Table 4.

TABLE 4

| No. | Ti* Content in solid product (II) (mg/g) | Polymer yield (g) per g of solid product (II)* | Polymer yield (g) per g atom (× 10⁵) | IR-τ | Bending modulus ($\times 10^4$ kg/cm²) | Atactic index | $\overline{M_w}/\overline{M_n}$ | BD | MFR |
|---|---|---|---|---|---|---|---|---|---|
| Example 15 | 16.0 | 12,600 | 7.9 | 0.92 | 1.25 | 2.1 | 4.6 | 0.41 | 4.1 |
| Example 16 | 14.0 | 13,200 | 9.4 | 0.92 | 1.27 | 2.0 | 4.2 | 0.44 | 4.3 |
| Example 17 | 13.0 | 13,200 | 10.2 | 0.93 | 1.30 | 2.1 | 4.5 | 0.43 | 4.2 |
| Example 18 | 16.0 | 11,200 | 7.0 | 0.92 | 1.25 | 2.1 | 4.3 | 0.42 | 4.3 |
| Example 19 | 14.0 | 13,200 | 9.4 | 0.93 | 1.30 | 2.4 | 4.5 | 0.40 | 4.3 |
| Example 20 | 12.0 | 13,400 | 11.1 | 0.92 | 1.25 | 2.8 | 4.6 | 0.43 | 4.1 |
| Example 21 | 9.6 | 7,400 | 7.7 | 0.92 | 1.28 | 2.4 | 4.8 | 0.44 | 4.2 |
| Example 22 | 18.0 | 8,200 | 4.6 | 0.90 | 1.10 | 3.0 | 5.9 | 0.35 | 4.2 |
| Comparat. ex. 7 | 141 | 50 | 0.003 | 0.86 | — | 18.0 | 13.0 | 0.21 | 4.1 |
| Comparat. ex. 8 | 18.0 | 130 | 0.07 | 0.85 | — | 16.0 | 12.4 | 0.25 | 4.3 |

*Ti-containing catalyst comnponents combined with organoaluminum, etc. in Comparative examples are also included in this column, for convenience. This applies to the succeeding Tables.

EXAMPLE 23

Preparation of the preliminarily activated catalyst, its still standing and propylene polymerization were carried out as in Example 1 except that aluminum tribromide (anhydrous) (100 g) was employed in place of aluminum trichloride (anhydrous) in the preparation of the solid product (I).

EXAMPLE 24

Preparation of the preliminarily activated catalyst, its still standing and propylene polymerization were carried out as in Example 1 except that ferric chloride (anhydrous) (120 g) was employed in place of aluminum trichloride (anhydrous) in the preparation of the solid product (I).

EXAMPLE 25

Preparation of the preliminarily activated catalyst, its still standing and propylene polymerization were carried out as in Example 1 except that, in the preparation of the solid product (I), 60 g of magnesium hydroxide were employed in place of magnesium oxide and milling reaction thereof with aluminum trichloride was carried out in a vibration mill at 180° C. for 5 hours.

EXAMPLE 26

Preparation of the preliminarily activated catalyst, its still standing and propylene polymerization were carried out as in Example 1 except that, in the preparation of the solid product (I), 50 g of hydrotalcite (Mg₆Al₂(OH)₁₆CO₃.4H₂O) were employed in place of magnesium oxide, and milling reaction thereof with aluminum trichloride was carried out in a ball mill at 90° C. for 60 hours.

EXAMPLE 27

Preparation of the preliminarily activated catalyst, its still standing and propylene polymerization were carried out as in Example 1 except that, in the preparation of the solid product (I), 98 g of magnesium carbonate were employed in place of magnesium oxide, and milling reaction thereof with aluminum trichloride was carried out in a ball mill at 180° C. for 48 hours.

EXAMPLE 28

Preparation of the preliminarily activated catalyst, its still standing and propylene polymerization were carried as in Example 1 except that, in the preparation of the solid product (I), aluminum magnesium oxide (MgAl₂O₄) (140 g) were used in place of magnesium oxide, and milling reaction thereof with aluminum trichloride was carried out in a ball mill, followed by heating at 320° C. for 5 hours, thereafter cooling down to room temperature (20° C.), and further milling in a ball mill for 10 hours.

EXAMPLE 29

Preparation of the preliminarily activated catalyst, its still standing and propylene polymerization were carried out as in Example 1 except that, in the preparation of the solid product (I), 130 g of hydromagnesite (3MgCO₃.Mg(OH)₂.3H₂O) were employed in place of magnesium oxide, and milling reaction thereof with aluminum trichloride was carried out in a vibration mill for one hour, followed by heating at 250° C. for one hour, thereafter cooling down to room temperature (20° C.), and further milling in a vibration mill for 30 minutes.

COMPARATIVE EXAMPLE 9

Preparation of the preliminarily activated catalyst, its still standing and propylene polymerization were carried out as in Example 1 except that 100 g of magnesium oxide were employed in place of the solid product (I), in the preparation of the solid product (II).

COMPARATIVE EXAMPLE 10

Preparation of the preliminarily activated catalyst, its still standing and propylene polymerization were carried out as in Example 1 except that 100 g of aluminum trichloride (anhydrous) were employed in place of the solid product (I), in the preparation of the solid product (II).

The results of the above Examples 23~29 and Comparative examples 9 and 10 are shown in Table 5.

TABLE 5

| No. | Ti content in solid product (II) (mg/g) | Polymer yield (g) per g of solid product (II) | per g of Ti atom (× 10⁵) | IR-τ | Bending modulus (× 10⁴ kg/cm²) | Atactic index | $\overline{M_w}/\overline{M_n}$ | BD | MFR |
| --- | --- | --- | --- | --- | --- | --- | --- | --- | --- |
| Example 23 | 18.0 | 10,500 | 5.8 | 0.93 | 1.30 | 2.2 | 4.2 | 0.43 | 4.8 |
| Example 24 | 11.0 | 7,200 | 6.5 | 0.92 | 1.28 | 2.0 | 4.1 | 0.41 | 4.4 |
| Example 25 | 21.0 | 12,200 | 5.8 | 0.92 | 1.24 | 2.2 | 4.6 | 0.44 | 4.3 |
| Example 26 | 21.0 | 10,800 | 5.1 | 0.93 | 1.28 | 2.1 | 5.1 | 0.44 | 4.2 |
| Example 27 | 16.0 | 10,400 | 6.5 | 0.92 | 1.24 | 2.1 | 4.9 | 0.43 | 4.1 |
| Example 28 | 19.0 | 10,200 | 5.4 | 0.91 | 1.21 | 2.0 | 4.6 | 0.43 | 4.1 |
| Example 29 | 17.0 | 10,000 | 5.9 | 0.92 | 1.23 | 2.1 | 4.4 | 0.43 | 4.1 |
| Comparat. ex. 9 | 28.0 | 300 | 0.1 | 0.86 | — | 7.9 | 12.0 | 0.25 | 4.2 |
| Comparat. ex. 10 | 57.0 | 120 | 0.02 | 0.85 | — | 15.0 | 14.0 | 0.22 | 4.3 |

EXAMPLE 30

A preliminarily activated catalyst was prepared as in Example 3, and allowed to stand for 6 hours. The resulting catalyst was introduced into a fluidized bed reactor having a diameter of 40 cm and a volume of 100 l, equipped with stirring blades. Further, 300 ml of hydrogen were introduced. Gas phase polymerization reaction was carried out under a pressure of propylene of 21 kg/cm²G at 65° C. for 3 hours, while propylene was circulated at a flow rate of 5 cm/sec. and while polymer was fluidized.

EXAMPLE 31

A preliminarily activated catalyst was prepared as in Example 1 and allowed to stand for 6 hours. The catalyst was introduced into liquefied propylene (4,800 g) containing hydrogen (7,200 ml), and polymerization reaction was carried out under 32 kg/cm²G at 70° C. for 30 minutes, followed by purging unreacted propylene to obtain a polymer.

EXAMPLE 32

Bulk polymerization reaction was carried out under 32 kg/cm²G, at 70° C., for 30 minutes as in Example 31. The resulting slurry containing unreacted propylene was flushed into a fluidized bed reactor having a diameter of 40 cm and a volume of 100 l, equipped with stirring blades, and gas phase polymerization reaction was carried out under a partial pressure of propylene of 21 kg/cm²G (which was maintained while feeding fresh propylene since the partial pressure decreased with the progress of polymerization), at a reaction temperature of 65° C., for 2 hours, while propylene was circulated at a flow rate of 5 cm/sec. and while polymer was fluidized.

EXAMPLE 33

A propylene-ethylene copolymer was prepared as in Example 1 except that 80 g of ethylene and 3,200 ml of hydrogene were employed in addition to propylene in Example 1, (3).

EXAMPLE 34

A propylene-butene-1 copolymer was prepared as in Example 1 except that 48 g of butene-1 and 4,000 ml of hydrogen were employed in addition to propylene in Example 1, (3).

EXAMPLE 35

Ethylene polymerization was carried out under the same catalyst conditions, polymerization time and post-treatment as in Example 1 to obtain a polymer, except that it was carried out under a partial pressure of hydrogen of 10 kg/cm²G, and a partial pressure of ethylene of 15 kg/cm², at a polymerization temperature of 85° C.

The results of the above Examples 30~35 are shown in Table 6.

TABLE 6

| No. | Ti content in solid product (II) (mg/g) | Polymer yield (g) per g of solid product (II) | per g of Ti atom (× 10⁵) | IR-τ | Bending modulus (× 10⁴ kg/cm²) | Atactic index | $\overline{M_w}/\overline{M_n}$ | BD | MFR |
| --- | --- | --- | --- | --- | --- | --- | --- | --- | --- |
| Example 30 | 12.0 | 13,400 | 11.1 | 0.93 | 1.30 | 2.0 | 4.3 | 0.44 | 4.3 |
| Example 31 | 12.0 | 5,200 | 4.3 | 0.93 | 1.29 | 2.0 | 4.1 | 0.43 | 4.4 |
| Example 32 | 12.0 | 14,100 | 11.8 | 0.92 | 1.27 | 2.2 | 4.3 | 0.42 | 4.0 |
| Example 33 | 12.0 | 14,700 | 12.3 | 0.91 | 1.20 | 2.2 | 4.3 | 0.42 | 4.2 |
| Example 34 | 12.0 | 14,300 | 11.9 | 0.91 | 1.22 | 2.1 | 4.4 | 0.43 | 4.3 |
| Example 35 | 12.0 | 12,000 | 10.0 | — | 1.10 | — | 4.8 | 0.40 | 4.2 |

What is claimed is:

1. A process for producing α-olefin polymers which comprises:
    milling (A) a trivalent metal halide selected from the group consisting of aluminum trichloride (anhydrous), ferric chloride (anhydrous) and aluminum tribromide (anhydrous), together with (B) a divalent metal compound selected from the group consisting of
Mg(OH)$_2$, Ca(OH)$_2$, Zn(OH)$_2$, Mn(OH)$_2$, MgO, CaO, ZnO, MnO, MgAl$_2$O$_4$, Mg$_2$SiO$_4$, Mg$_6$MnO$_8$, MgCO$_3$, MnCO$_3$, MgCO$_3$.CaCO$_3$, SnCl$_2$.2H$_2$O, MgCl$_2$.nH$_2$O (n=1~6), NiCl$_2$.6H$_2$O, MnCl$_2$.4H$_2$O, KMgCl$_3$.6H$_2$O, MgCl$_2$.nMg(OH)$_2$.mH$_2$O (n=1~3, m=1~6), 3MgO.2SiO$_2$.2H$_2$O, 3MgCO$_3$.Mg(OH)$_2$.3H$_2$O and Mg$_6$Al$_2$(OH)$_{14}$CO$_3$.4H$_2$O,
in a proportion of 0.05 to 10 mols of (B) to one mol of (A), and
reacting them together at a temperature of room temperature (20° C.) to 500° C.,
to obtain a solid product (I);
reacting with 100 g of this solid product (I),
(C) an electron donor selected from the group consisting of alcohols, ethers, esters, aldehydes, fatty acids, ketones, nitriles, amines, amides, urea, thiourea, isocyanates, azo compounds, phosphines, phosphites, phosphinites, thioethers, thioalcohols and polysiloxanes, and
(D) an electron acceptor selected from the group consisting of (D-1) aluminum chloride compounds expressed by the formula R$_n$AlCl$_{3-n}$ (wherein $0 \leq n < 3$ and R is a hydrocarbon radical of 1 to 20 carbon atoms), (D-2) inorganic chlorides of an atom selected from the group consisting of Si, Sn, Ti, Zr, P, V, Sb, S, Mn, Fe and Ni, and (D-3) organomagnesium compounds expressed by the formula (MgR$_2$)a.(R'MgX)$_b$ (wherein R and R' are each an alkyl group of 1 to 20 carbon atoms or a phenyl group substituted or unsubstituted by an alkyl group of 1 to 10 carbon atoms; X is Cl, Br or I; and a and b are each a number of 0 to 1, and a+b=1),
at a reaction temperature of 0° to 500° C.,
(C) and (D) being respectively reacted once or twice or more up to 10 times,
TiCl$_4$ being employed as said electron acceptor at least once, and
(C) and (D) being respectively employed in an amount of 5 to 50 g a time,
to obtain a solid product (II),
(this reaction being referred to as formation reaction of solid product (II));
combining with 1 g of this solid product (II),
(E) 0.5 to 500 g of a trialkylaluminum, and
(G) 1 to 20 g of a reaction product of an electron donor with an electron acceptor, both being selected from among the substances listed above in the respective groups of (C) and (D),
(said solid product (II), (E) and (G) employed for this combination being referred to as catalyst components), and
at the time of this combination, subjecting a part or the whole of the catalyst components to polymerization treatment by reacting (F) an α-olefin at a temperature of 0° to 100° C. in an amount of 0.1 to 500 g, at least in the presence of said solid product (II) and trialkylaluminum,
to obtain a preliminarily activated catalyst; and
polymerizing an α-olefin or α-olefins in the presence of this catalyst.

2. A process according to claim 1 wherein TiCl$_4$ alone is employed as said (D).

3. A process according to claim 1 wherein TiCl$_4$ together with (D) other than TiCl$_4$ are employed as said (D).

4. A process according to claim 3 wherein said (D-1) or (D-2) is employed as said (D) other than TiCl$_4$.

5. A process according to claim 3 wherein said (D-1) and/or said (D-2) and said (D-3) are employed as said (D) other than TiCl$_4$.

6. A process according to claim 1, claim 3, claim 4 or claim 5 wherein said (D-1) aluminum chloride compound is selected from the group consisting of AlCl$_3$ (anhydrous), C$_2$H$_5$AlCl$_2$, C$_3$H$_7$AlCl$_2$, n-C$_4$H$_9$AlCl$_2$, i-C$_4$H$_9$AlCl$_2$, (C$_2$H$_5$)$_{1.5}$Al Cl$_{1.5}$ (ethylaluminum sesquichloride), (C$_2$H$_5$)$_2$AlCl, (n-C$_3$H$_7$)$_2$AlCl and (i-C$_4$H$_9$)$_2$AlCl.

7. A process according to claim 1, claim 3, claim 4 or claim 5 wherein said (D-2) inorganic chloride is selected from the group consisting of SiCl$_4$, SnCl$_2$, SnCl$_4$, TiCl$_4$, ZrCl$_4$, PCl$_3$, PCl$_5$, VCl$_4$, SbCl$_5$, SCl$_2$, MnCl$_2$, FeCl$_2$ and NiCl$_2$.

8. A process according to claim 1, claim 3 or claim 5 wherein said (D-3) organomagnesium compound is selected from the group consisting of CH$_3$MgCl, CH$_3$MgBr, C$_2$H$_5$MgCl, C$_2$H$_5$MgBr, C$_3$H$_7$MgCl, C$_3$H$_7$MgBr, C$_4$H$_9$MgCl, C$_4$H$_9$MgBr, C$_5$H$_{11}$MgCl, C$_5$H$_{11}$MgBr, C$_6$H$_{13}$MgCl, C$_6$H$_{13}$MgBr, C$_7$H$_{15}$MgCl, C$_7$H$_{15}$MgBr, C$_8$H$_{17}$MgCl, C$_8$H$_{17}$MgBr, C$_9$H$_{19}$MgCl, C$_9$H$_{19}$MgBr, C$_{10}$H$_{21}$MgCl, C$_{10}$H$_{21}$MgBr, C$_6$H$_5$MgCl, C$_6$H$_5$MgBr, CH$_3$(C$_6$H$_4$)MgCl and CH$_3$(C$_6$H$_5$))MgBr.

9. A process according to claim 1 wherein, in said formation reaction of solid product (II), said reaction of at least once of TiCl$_4$ is carried out in the final step of the formation reaction of solid product (II) and in suspension manner; and in the step prior to the final one, at the time when said solid product (I) and said (C) an electron donor and said (D) an electron acceptor which may be TiCl$_4$, both to be reacted with said solid product (I), have been all brought into a coexistent state, these three are reacted together by milling.

10. A process according to claim 9 wherein said reaction of TiCl$_4$ to be carried out in the final step of the formation reaction of solid product (II) is carried out successively twice.

11. A process according to claim 1 wherein said (E) trialkylaluminum is selected from the group consisting of trimethylaluminum, triethylaluminum, tri-n-propylaluminum, tri-n-butylaluminum, tri-i-butylaluminum, tri-n-hexylaluminum, tri-i-hexylaluminum, tri-2-methylpentylaluminum, tri-n-octylaluminum and tri-n-decylaluminum.

12. A process according to claim 1 wherein said (G) reaction product of said (C) electron donor with said (D) electron acceptor is obtained by reacting 100 g of (C) with 10 to 500 g of (D) at a temperature of −5° C. to 200° C.

13. A process according to claim 1 wherein said α-olefin polymerization is carried out by gas phase polymerization.

14. A process according to claim 1 wherein said α-olefin polymerization is carried out by slurry or bulk polymerization followed by gas phase polymerization.

15. A process according to claim 1 wherein an α-olefin or α-olefins are subjected to slurry polymerization followed by solvent removal.

* * * * *